United States Patent [19]

Minchak et al.

[11] Patent Number: 4,701,510
[45] Date of Patent: Oct. 20, 1987

[54] POLYCYCLOOLEFINS RESISTANT TO SOLVENTS

[75] Inventors: Robert J. Minchak, Parma Heights; Parley C. Lane, Jr., Cuyahoga Falls, both of Ohio

[73] Assignee: The B.F. Goodrich Company, Akron, Ohio

[21] Appl. No.: 809,685

[22] Filed: Dec. 16, 1985

[51] Int. Cl.$^4$ .............................................. C08F 32/06
[52] U.S. Cl. ................................... 526/283; 526/161; 526/166; 526/169; 526/281
[58] Field of Search ............... 526/161, 166, 169, 281, 526/283

[56] References Cited

U.S. PATENT DOCUMENTS

| 4,110,528 | 8/1978 | Minchak | 526/281 |
| 4,136,248 | 1/1979 | Tenney | 526/169 |
| 4,136,249 | 1/1979 | Tenney | 526/169 |
| 4,178,424 | 12/1979 | Tenney | 526/169 |
| 4,380,617 | 4/1983 | Minchak | 526/283 |
| 4,426,502 | 1/1984 | Minchak | 526/281 |
| 4,431,785 | 2/1984 | Howell | 526/281 |

Primary Examiner—Paul R. Michl
Attorney, Agent, or Firm—George A. Kap

[57] ABSTRACT

Thermoset polycycloolefins are obtained by polymerzing at an elevated temperature a cycloolefin containing at least one norbornene group in the presence of a metathesis catalyst system and also in the presence of an effective amount of a polyfunctional cycloolefin crosslinker containing at least one norbornene group, but preferably two or more, with two or more unsaturated sites, preferably two or more double bonds.

18 Claims, No Drawings

POLYCYCLOOLEFINS RESISTANT TO SOLVENTS

BACKGROUND OF THE INVENTION

It is known that cycloolefins containing a norbornene moiety can be polymerized in the presence of an alkylaluminum halide cocatalyst and a molybdenum or tungsten halide catalyst. This is accomplished by mixing a cycloolefin with a solvent and charging the mixture to a reactor. A molecular weight modifier is charged to the reactor followed by cocatalyst and catalyst. The catalyst is added as a solution in an alkylester of a saturated carboxylic acid, since it is insoluble in the monomer. Polymerization is conducted by ring opening at 0° to 200° C. and is completed in less than 2 hours after shortstopping with an alcohol. The reaction product is a smooth, viscous material of a honey-like consistency comprising polycycloolefin dissolved in the solvent.

U.S. Pat. No. 4,380,617 to Minchak et al discloses the use of organoammonium molybdates and tungstates in the polymerization of cycloolefins. The organoammonium molybdate and tungstate catalysts are soluble in cycloolefins and therefore, do not require the use of an alkylester solvent, which caused problems in the prior art polymerization. Furthermore, since the catalyst is soluble in cycloolefins, polymerization of the cycloolefins in bulk is thereby facilitated.

Although the function of the catalyst is improved by using organoammonium molybdates or tungstates instead of molybdenum or tungsten halides, the cocatalyst is still too active and results in rapid polymerization of cycloolefins which is difficult to control. U.S. Pat. No. 4,426,502 discloses the use of alkoxy-aluminum halide or aryloxyaluminum halide cocatalysts. By introducing an alkoxy or an aryloxy group into the cocatalysts, it is thus possible to diminish the reducing power of the cocatalysts so that a controlled polymerization can be conducted. The use of such cocatalysts makes it possible to prepare a monomer mix at room temperature which is inactive and then to polymerize the monomer mix at an elevated temperature, as by injecting it into a pre-heated mold. It is particularly significant that diminishing the reducing power of the cocatalysts by this method does not retard the rate of polymerization in a real sense. This development makes it possible to polymerize cycloolefins in bulk or by reaction injection molding, which is a form of bulk polymerization.

Polycycloolefins have found numerous applications in the electronics industry, however, the presence of a halogen in the system cannot be tolerated since halogen can corrode or have other adverse electrical effects and render a circuit unreliable or inoperable. U.S. patent application entitled "Polymerization of Cycloolefins With Halogen-Free Cocatalysts" by inventors Minchak et al, discloses halogen-free cocatalysts which can be used with halogen-free catalysts in a halogen-free system to polymerize cycloolefins. The halogen-free cocatalysts are characterized by the use of an alkylaluminum, specifically trialkylaluminum, cocatalyst in conjunction with a modifier compound selected from trialkyl tin oxides, with or without a hindered phenol. The cocatalyst can also be devoid of a modifier compound in which instance, it includes a trialkylaluminum which is used together with a hindered phenol.

SUMMARY OF THE INVENTION

This invention pertains to the use of a minor amount of a polyfunctional crosslinking cycloolefin containing at least two norbornene structures each containing at least one unsaturated bond, or a norbornadiene, in a polymerization system containing a cycloolefin monomer, a catalyst and a cocatalyst whereby upon polymerization of the cycloolefin monomer, a cured or crosslinked, thermoset polycycloolefin is obtained having a swell index of less than about 10. Furthermore, the degree of crosslinking can be easily controlled by the type and amount of the crosslinker employed to regulate the properties of the resulting polymer.

DETAILED DESCRIPTION OF THE INVENTION

This invention is directed to the use of certain polyfunctional cycloolefins as crosslinkers by incorporating such crosslinkers in the monomer mix and polymerizing such monomer mix at an elevated temperature whereby a crosslinked polymer is obtained. As used herein, the term "polyfunctional" means that the crosslinking monomer has two or more unsaturated sites or double bonds in its structure, preferably two bicycloheptene structures, fused or not. The crosslinked polymers are resistant to solvents in the sense that they are insoluble in solvents or swell therein to the extent of having a swell index of less than about 10, preferably a swell index of less than about 5.

The swell index is determined by placing 0.1 gram of a crosslinked polycycloolefin sample in 25 mls of toluene and holding it in toluene for a period at least 5 days. Thereafter, the liquid is poured out, the swollen polymer sample is weighed, and the weight of the original polymer sample (0.1 g) subtracted to obtain the weight of toluene in the swollen polymer sample. The swell index is calculated by dividing the weight of toluene in the swollen polymer sample by the weight of the original polymer sample (0.1 g). Therefore, a swell index is an indication of the amount of toluene taken up by the polymer sample. For instance, a swell index of 3 indicates that a polymer sample absorbed 3 times its weight of toluene.

As crosslinkers for polycycloolefins, the polyfunctional cycloolefin crosslinkers are used in a relatively small amount for the purpose of curing or crosslinking the polymer structure of a polycycloolefin at an elevated temperature. Amount of the crosslinkers varies widely. For a crosslinker such as norbornadiene, amount varies from 0.005 to 0.5, preferably 0.01 to 0.2 moles of the crosslinker per mole of monomer charge. For crosslinkers having two or more norbornene groups, suitable amount thereof varies from 0.0001 to 0.1, preferably 0.0005 to 0.01 moles of the crosslinker per mole of the polycycloolefin. In addition to the catalyst, cocatalyst, temperature, and other variables, amount of the crosslinker affects molecular weight of the resulting polymer. Generally speaking, the more crosslinker used, the higher will be the molecular weight.

It should be recalled that ring opening polymerization of cycloolefins containing a norbornene group results in a rupture of the ring and linear polymerization of the monomer. The linear structure of the polycycloolefin is characterized by the presence of unsaturation, which serves as the necessary sites for crosslinking. This system of crosslinking is unusual since crosslinking is accomplished in absence of free radicals, photoinitiators, or other initiators. Crosslinking herein is accomplished by polymerizing the polyfunctional cycloolefins with a cycloolefin monomer in a manner wherein the crosslinker functions as a comonomer, however, due to its multiple functionality, its polymerization is multidimensional, producing a crosslinked thermoset polymer. If the polymerization is carried out in absence of the crosslinker, a thermoplastic polymer is obtained which has a high degree of solubility in hydrocarbon solvents.

Suitable polyfunctional crosslinkers include cycloolefins containing at least two norbornene groups each with one or more unsaturated sites. Suitable polyfunctional crosslinkers also include norbornadiene, which contains a bicyclo structure with two unsaturation sites. In a preferred embodiment, such polyfunctional crosslinkers include cycloolefins containing two or more norbornene groups and a total of two or more double bonds, and particularly such compounds in symmetrical structure. The preferred crosslinkers can also be defined more specifically as being selected from cycloolefin monomers having terminal or pendant norbornene groups with each norbornene group containing one double bond.

Examples of specific crosslinkers for purposes herein include norbornadiene, tetracyclododecadiene, symmetrical cyclopentadiene trimer, reaction products of two moles of a cyclopentadiene with one mole of a diene, and the like. Preferred crosslinkers defined herein include norbornadiene, tetracyclododecadiene, symmetrical cyclopentadiene trimer, and symmetrical reaction products of two moles of a cyclopentadiene with one mole of a diene such as butadiene. Structural formulas of some of the preferred crosslinkers are given below to facilitate identification thereof:

 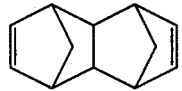

norbornadiene   tetracyclododecadiene

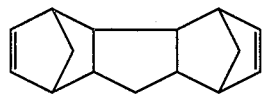

symmetrical
dicyclopentadiene trimer

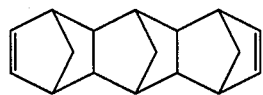

hexacycloheptadecadiene (n = 1)
and derivatives thereof

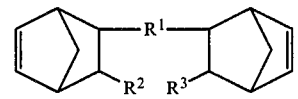

symmetrical products of
2 moles cyclopentadiene with 1 mol diene

In the symmetrical reaction products of cyclopentadiene with a diene, $R^1$ is selected from alkyl groups of 0 to 50 carbon atoms, preferably 0 to 10 carbon atoms; $R^2$ and $R^3$ are individually selected from hydrogen, alkyl and alkylene groups containing 0 to 50 carbon atoms, preferably $R^2$ and $R^3$ are individually selected from hydrogen and alkyl groups of 0 to 10 carbon atoms; and $R^2$ and $R^3$ can be combined to form a cyclic structure containing a total of 0 to 50 carbon atoms, preferably 0 to 10 carbon atoms. The crosslinkers are commercially available.

As can be verified from the data in the appended examples, the preferred polyfunctional cycloolefin crosslinkers are those that contain two or more norbornene groups arranged symmetrically in the molecule and two or more unsaturation sites. Particularly preferred are those crosslinkers with two or more norbornene groups with the norbornene groups being in the terminal positions of a molecule and containing one double bond in each terminal norbornene group. This was verified in a number of different ways. In one approach, a small amount of dicyclopentadiene (DCPD) was used in the polymerization of methyltetracyclododecene (MTD) monomer employing the usual procedure. A polymer was obtained with a very high swelling index. This experiment was repeated but doubling the amount of DCPD used. The resulting polymer had, nevertheless, a very high swelling index, indicating ineffectiveness of DCPD as a crosslinker.

It does not appear to be surprising that DCPD is relatively ineffective as a crosslinker for polycycloolefins. Since DCPD has the following structural formula,

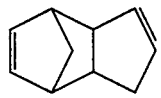

it is evident that it lacks a second norbornene group with unsaturation. The double bond on the cyclopentene ring, in the above formula, does not appear to be as effective in the crosslinking reaction as the double bond on a norbornene ring in the corresponding position.

The cycloolefin monomer, or a mixture thereof, can be polymerized with the crosslinker in solution or in bulk, in the presence of a suitable catalyst and cocatalyst, as well as other desired additives. In solution polymerization, a suitable solvent is employed together with a molecular weight modifier. Unless a proper proportion of the components is used, solution polymerization can lead to a mass of highly polymerized material of dubious utility. In bulk polymerization, principal parameters that affect molecular weight of the resulting polymer include reaction temperature, amount and particular catalyst and cocatalyst, and amount and particular crosslinker employed. Therefore, selection of a crosslinker and amount therefore should be carefully made and tailored to the desired polymer that is obtained. For instance, since tetracyclododecadiene is many times more effective as a crosslinker than is norbornadiene, a much smaller amount of tetracyclododecadiene need be used to obtain similar results.

Bulk polymerization of a cycloolefin monomer containing a norbornene group can be conducted by adding the monomer and a polyfunctional cycloolefin crosslinker to a reactor maintained at room temperature. An antioxidant, such as a hindered phenol, can then be added to the reactor followed by a modifier compound, such as a bis(trialkyltin) oxide. This is followed by the addition of a metathesis catalyst system to the reactor, which includes a cocatalyst and a catalyst. There should be no reaction taking place at room temperature when the cocatalyst contains an alkoxy or an aryloxy moiety, however, on heating the reactor to an elevated temperature, the polymerization reaction is initiated with the crosslinker functioning in some respects as a copolymer by being copolymerized with the monomer. Due to the presence of polyfunctional moieties in the crosslinker, it also functions to crosslink the polymer structure to a thermoset condition. The reaction is completed in less than 10 minutes, preferably in less than 5 minutes, and the crosslinked thermoset polymer can be extracted from the reactor. As should be apparent, the reactor can be a mold which is pre-heated and maintained at an elevated temperature to expedite the process.

The products obtained as described above, are of high molecular weight thermoset polymers which have dimensional stability and solvent resistance. Such products are useful in making automotive parts, electrical components, and the like.

The norbornene-type monomers or cycloolefins that can be polymerized in accordance with the process described herein, are characterized by the presence of at least one of the following norbornene group, identified by formula I, that can be substituted or unsubstituted:

(I)

Pursuant to this definition, suitable norbornene-type monomers include substituted and unsubstituted norbornenes, dicyclopentadienes, dihydrodicyclopentadienes, trimers of cyclopentadiene, and tetracyclododecenes. Preferred monomers of the norbornene-type are those defined by the following formulas II, III and IV:

(II)

(III)

(IV)

where R and $R^1$ are independently selected from hydrogen, alkyl, and aryl groups of 1 to 20 carbon atoms, and saturated and unsaturated cyclic groups containing 3 to 12 carbon atoms formed by R and $R^1$ together with the two ring carbon atoms connected thereto. In a preferred embodiment, R and $R^1$ are independently selected from hydrogen and alkyl groups of 1 to 2 carbon atoms. Examples of preferred monomers referred to herein include dicyclopentadiene, tetracyclododecene, methyltetracyclododecene, hexacycloheptadecene, methyl hexacycloheptadecene, 2-norbornene and other norbornene monomers such as 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, and 5-dodecycl-2-norbornene.

This invention especially contemplates preparation of homopolymers, copolymers and terpolymers of norbornene methylnorbornene, tetracyclododecene, methyltetracyclododecene, hexacycloheptadecene, methyl hexacycloheptadecene, and dicylopentadiene and especially homopolymers of methyltetracyclododecene and copolymers of methyltetracyclododecene and methylnorbornene. The copolymers of methyltetracyclododecene and methylnorbornene are polymerized from monomer mixtures containing from 1 to 99% by weight methylnorbornene. The terpolymers are polymerized from monomer mixtures containing 1 to 99% by weight methylnorbornene and 1 to 99% by weight methyltetracyclododecene, with the remainder being dicyclopentadiene or other bicycloolefins.

The monomer or mixture of norbornene-type monomers can contain up to about 20% by weight thereof of at least one other copolymerizable monomer. Such other copolymerizable monomers are preferably selected from mono- and dicycloolefins containing 4 to 12 carbon atoms, preferably 4 to 8 carbon atoms, examples of which include cyclobutene, cyclopentene, cyclopentadiene, cycloheptene, cyclooctene, 1,5-cyclooctadiene, cyclodecene, cyclododecene, cyclododecadiene, and cyclododecatriene.

Any metathesis catalyst system can be used herein to conduct polymerization of cycloolefin monomers containing a norbornene group, a mixture of such cycloolefin monomers, or a mixture of at least one such cycloolefin with up to about 20% by weight of at least one other copolymerizable monomer, particularly cycloolefins of 4 to 12 carbon atoms which are devoid of a norbornene group. The use of a metathesis catalyst leads to ring opening polymerization of the cycloolefin monomers that contain a norbornene group. The metathesis catalyst system includes a catalyst and a cocatalyst.

The catalyst useful herein is selected from ring-opening metathesis catalysts. In this type of polymerizations, the ring of the monomers is broken at one double bond to form linear polymers containing unsaturation. The metathesis catalysts include the molybdenum and tungsten halides, particularly molybdenum pentachloride and tungsten hexachloride, or variations thereof, used especially in solution polymerization. These catalysts are normally used in an organic medium, such as ethyl acetate and/or toluene, and these catalysts are unstable in air and and moisture. They react with air or moisture to form oxides or hydrogen chloride. In presence of oxygen or air, these compounds eventually oxidize to the respective oxides. Therefore, the halides of molydenum and tungsten should be handled in absence of air and moisture.

The molybdenum and tungsten halides in the cycloolefin monomers start polymerizing the monomer even on standing at room temperature. A polymer begins to form after several hours of standing at room temperature, the polymer being an undesirable gel or a grainy mass of polymer in monomer.

The metathesis catalysts also include the ammonium molybdates and tungstates described in Minchak U.S. Pat. No. 4,426,502. These catalysts are modified from the earlier version and can be handled at room temperature in a room environment, i.e., in the presence of air and moisture. These catalysts do not polymerize monomers but give stable catalyst solutions in the monomers. In a preferred embodiment, the ammonium molybdate and tungstate catalysts are used in a monomer solution to facilitate admixing the catalyst with the other ingredients of the polymerization system. Molybdenum (III) acetylacetonate or other organic soluble molybdenum or tungsten halogen-free compounds can be used as catalysts herein.

The ammonium or organoammonium molybdates and tungstates suitable herein as catalysts are defined as follows:

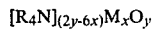

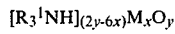

where O represents oxygen; M represents either molybdenum or tungsten; x and y represent the number of M and O atoms in the molecule based on the valence of $+6$ for molybdenum, $+6$ for tungsten, and $-2$ for oxygen; and the R and $R^1$ radicals can be same or different and are selected from hydrogen, alkyl, and alkylene groups containing from 1 to 20 carbon atoms, and cycloaliphatic groups each containing from 5 to 16 carbon atoms. In a preferred embodiment, the R radicals are selected from alkyl groups each containing 1 to 18 carbon atoms wherein the sum of carbon atoms on all the R radicals is from 20 to 72, more preferably from 25 to 48. In a preferred embodiment, the $R^1$ radicals are selected from alkyl groups each containing from 1 to 18 carbon atoms wherein the sum of carbon atoms on all of the $R^1$ radicals is from 15 to 54, more preferably from 21 to 42.

The Minchak U.S. Pat. No. 4,426,502, referred to earlier, further defines the catalysts in instances where all or some of the R and $R^1$ groups are same or different, which disclosure is incorporated as if fully set forth herein.

Specific examples of suitable organoammonium molybdates and tungstates described herein include tridodecylammonium molybdates and tungstates, methyltricaprylammonium molybdates and tungstates, tri(tridecyl)ammonium molybdates and tungstates, and trioctylammonium molybdates and tungstates.

U.S. Pat. No. 4,380,617 to Minchak et al discloses ring opening polymerization of a cycloolefin with a norbornene group in the presence of an alkylaluminum halide cocatalyst and an organoammonium molybdate or tungstate catalyst.

U.S. Pat. No. 4,426,502 to Minchak describes bulk polymerization of cycloolefins using a modified cocatalyst with a catalyst whereby polymerization of the cycloolefin monomers can be conducted in absence of a solvent or a diluent. The alkylaluminum halide cocatalyst is modified by pre-reacting it with an alcohol or an active hydroxy-containing compound to form an alkoxyalkylaluminum halide or an aryloxyalkylaluminum halide which is then used in the polymerization reaction. The pre-reaction can be accomplished by using oxygen, an alcohol, or a phenol. As noted at bottom of column 4 of the Minchak patent, hindered phenols do not form the phenoxyaluminum groups and are relatively inert. The alkoxy or aryloxy group on the cocatalyst functions to inhibit the reducing power of the cocatalyst by replacing some of the alkyl groups on the aluminum. This makes it possible to first contact all the catalyst components at ambient temperature and to react cyclic olefins by means of bulk polymerization by thermal activation.

It is important to lower the reducing power of the cocatalysts in order to make such bulk polymerization reactions practical. When an unmodified alkylaluminum cocatalyst is used with a catalyst to polymerize a cycloolefin, the reaction is very rapid. In such systems, polymerization in unacceptable since the active catalyst species are quickly encapsulated by polymer formed on contact between the cocatalyst, catalyst and monomer and is, therefore, not able to contact additional monomer present in the system for polymerization to continue. Mixing of the ingredients is accomplished by mixing the ingredients at room temperature without polymerization reaction or encapsulation.

Towards the bottom of column 5 of the Minchak patent, it is stated that to be useful in bulk polymerization, the cocatalysts must contain at least some halogen, some alkoxy or aryloxy groups, and some alkyl groups, along with aluminum. As stated therein, when the cocatalyst is a trialkylaluminum, the polymerization product is a viscous cement wherein conversion of only up to about 30% is achieved even at a temperature as high as 140° C. When the cocatalyst is aluminum trihalide or trialkoxyaluminum, very little or no desirable polymerization takes place. The use of aluminum trihalide is not recommended because of uncontrollable reaction leading to formation of a black, hard resin. Same is true of dialkoxyaluminum halide cocatalyst, since it does not contain any alkyl group.

Contrary to the disclosure in the Minchak patent, a halogen-free cocatalyst can be used to polymerize norbornene-containing cycloolefins in the presence of a suitable metathesis catalyst. Such polymerizations are thermally initiated and are conducted at an elevated temperature of about 50° to 200° C., preferably at 90° to 150° C. The system containing the catalyst and the cocatalyst is essentially inert at room temperature, which means that pot life is more than adequate at ambient conditions. However, the reaction takes place at elevated temperatures and can be completed in less than about one-half hour, preferably in less than one-fourth hour, and more preferably in less than about 5 minutes. If polymerization is conducted by reaction injection molding, polymerization is completed and a hard molded product can be extracted in less than 5 minutes when polymerization temperature in the range of 50°-200° C. is used. This, of course, depends on many variables, not the least of which is the thickness of the molded object.

A halogen-free cocatalyst is disclosed in the related patent application entitled "Polymerization of Cycloolefins With Halogen-Free Cocatalysts" of inventors Minchak et al. That application discloses the use of an alkylaluminum, particularly trialkylaluminum, cocatalyst together with a modifier compound selected from alkyltin oxides, particularly bis(trialkyl tin) oxides. The polymerization is carried out in the presence of a catalyst and optionally, a hindered phenol. When the modifier compound is omitted, the system can be rendered operable by the use of a hindered phenol. Therefore, whenever a modifier compound selected from alkyltin oxides and sulfides is used, a hindered phenol is optional, however, if the modifier compound is omitted, the use of a hindered phenol is mandatory for an operable system.

Suitable hindered phenols for purposes herein include those defined as follows:

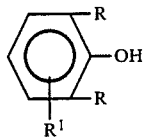

where R groups are individually selected from alkyl groups of 1 to 6 carbon atoms, and substituted and unsubstituted alicyclic groups of 4 to 8 carbon atoms; and R$^1$ groups, of which there can be 1 to 3 but preferably 1 or 2 such groups, are selected from hydrogen, alkyl groups of 1 to 12, preferably 2 to 8 carbon atoms, and substituted and unsubstituted alicyclic groups of 4 to 8 carbon atoms. In a preferred embodiment, R groups are tertiary alkyl groups, particularly t-butyl groups. There is one R$^1$ group in a preferred embodiment at the 4-position which is selected from alkyl groups, preferably lower alkyl groups, such as butyl.

The catalyst in the polymerization systems disclosed herein is employed at a level of about 0.01 to 50, preferably 0.1 to 10, millimoles per mole of monomer charge. The molar range of cocatalyst to catalyst can vary widely over the range of 200:1 to 1:10, preferably 10:1 to 2:1, of aluminum to molybdenum or tungsten. The molar ratio of the modifier compound to aluminum in the cocatalyst is in the range of 0.1 to 3, preferably 0.5 to 2, and especially about 1.25 moles of modifier compound per mole of aluminum. The amount of hindered phenol can be in the range of 0.0001 to 0.01, preferably 0.001 to 0.5 moles of the hindered phenol as moles of hydroxyl (OH) per mole of monomer charge. Per one mole of aluminum in the cocatalyst, amount of the hindered phenol is about 0.1-20 moles, preferably 1-10 moles as hydroxyl (OH).

In cases where polyfunctional cycloolefin crosslinkers are used, the resulting polymers are solvent resistant, crosslinked, thermoset products which can be elastomers or plastic, depending on Tg thereof.

The following examples demonstrate effectiveness of the herein-described polyfunctional cycloolefins as crosslinkers in the polymerization of cycloolefins containing at least one norbornene group.

A small amount of carbon tetrachloride was used in some of the examples that follow. This was done pursuant to the disclosure of Hercules U.S. Pat. No. 4,481,344, which teaches that the use of a small amount of a labile halide, such as in carbon tetrachloride, would yield high conversions on the order of 99.9%. The results in the following examples did not verify the teachings in the Hercules patent, possibly due to the fact that a somewhat different system was used herein. However, the minute amount of carbon tetrachloride is believed not to have affected the invention disclosed herein. Polydimethylsiloxane used in the examples functioned to protect the surface of the plaques that were produced. The antioxidants used were hindered phenols.

EXAMPLE 1

This example demonstrates polymerization of methyltetracyclododecene (MTD) in presence of metathesis catalyst system but in the absence of a crosslinker. Since this system is devoid of a crosslinker, this example is not illustrative of the invention disclosed herein.

The following materials were used in the polymerization of the MTD cycloolefin monomer:

50 mls MTD (48.5 grams or 0.279 mole)
1.0 g Ethyl 330 hindered phenol antioxidant
0.05 g polydimethylsiloxane
0.5 ml carbon tetrachloride (0.73 g)
2.8 ml of 0.5M propanol-1 soln in MTD (2.73 g or 1.25 millimole)
2.0 ml of 0.5M soln of diethylaluminum chloride in MTD (2.1 g or 1.0 millimole Al)
2.0 ml of 0.1M soln of tetrakis[tri(tridecyl)ammonium]octamolybdate (1.9 g or 0.01 millimole Mo)

In carrying out the polymerization reaction, the MTD monomer was added to a reaction vessel maintained at room temperature, which vessel was pre-dried and flushed with nitrogen before use. Then, the antioxidant, the siloxane, carbon tetrachloride, the propanol solution and the diethylaluminum chloride catalyst solution were added to the vessel with agitation after addition of each ingredient. After the ingredients were added and agitated, the reaction vessel was placed under a vacuum for 5 minutes and the vacuum was then broken with nitrogen to provide an inert atmosphere in the reaction vessel. Finally, the organoammonium catalyst solution was added to the reaction vessel which was then again evacuated for 1 minute and the vacuum was again broken with nitrogen.

The contents of the reaction vessel were transferred under a slight pressure to a mold pre-heated to 80° C. The reaction exothermed in the mold to a peak of 210° C. The plaque which was formed in the mold was left in the mold for 10 minutes after reaching the temperature peak to allow the material to cool down to mold temperature, and then was removed.

The plaque was greenish-yellow in color with distinct areas of dark green color. The dark green areas apparently resulted from the presence of carbon tetrachloride. A rigid plaque was obtained in about 1.2 minutes from the time the monomer charge was transferred into the mold. The plaque weighted 44.93 grams and the monomer conversion was 92%, as determined by TGA analysis. The swelling index (SI) of the plaque sample was 46.0, indicating a very high absorption of toluene by the sample and conversely, a very low degree of crosslinking.

EXAMPLE 2

This example is similar to Example 1 with the principal exception of using norbornadiene as the crosslinker, as described herein. This example, therefore, is illustrative of the invention disclosed herein.

Again, the following materials were added to a reaction vessel maintained at room temperature:
50 ml MTD
1.0 g Ethyl 330 hindered phenol antioxidant
0.05 g polydimethylsiloxane
2.0 ml neat norbornadiene (1.85 g or 0.020 mole)
0.5 ml carbon tetrachloride
2.5 ml propanol-1 soln (2.5 g or 1.25 m moles)
2.0 ml Et$_2$AlCl cocatalyst soln
2.0 ml molybdate catalyst solution The same materials in the same amounts were used here as in Example 1 with the exception of using the norbornadiene crosslinker which was added to the reaction vessel following the siloxane. After adding all of the above ingredients except the catalyst solution, the reaction vessel was evacuated for 7 minutes and the vacuum was broken with nitrogen. Then, the molybdate catalyst solution was added and the reaction vessel was again evacuated for 4 minutes and the vacuum was broken with nitrogen.

The mold at 80° C. was charged from the reaction vessel. The reaction in the mold ethothermed to 210° C. The plaque was left in the mold for 20 minutes after the temperature peak was reached and then removed. A rigid plaque was formed in the mold in about 1.0 minutes from the time of charging the mold.

The plaque was characterized by large areas of dark green to black color but the edges were clear. It weighted 47.43 g. Conversion to the polymer was 92.5%. Sample of this plaque had a swelling index of 9.3, indicating a substantial degree of crosslinking.

EXAMPLE 3

This example demonstrates preparation of crosslinked or thermosetting MTD using dicyclopentadiene (DCPD) trimer as the crosslinker. This trimer consisted of 5% by weight of symmetrical and 95% by weight of unsymmetrical trimer. Since the unsymmetrical trimer is considered to be much less effective as a crosslinker than the symmetrical trimer, it can be assumed herein that only 5% of the trimer used was effective as a crosslinker. This example is illustrative of the invention disclosed herein.

The same procedure was used herein to polymerize MTD using the following materials:
50 ml MTD
1.0 g Ethyl 330 antioxidant
0.05 g polydimethysiloxane
2.0 ml neat DCPD mixed trimer (2.17 g or 0.011 mole)
2.4 ml propanol-1 soln (2.39 g or 1.2 m mole)
2.0 ml Et$_2$AlCl cocatalyst soln
2.0 ml molybdate catalyst soln The plaque removed from the mold was rigid and weight 52.547 g. It was formed in 1.0 minutes from the time of charging the mold. Monomer conversion was 93.1% and the swelling index of the plaque sample was 3.9, indicating a high degree of crosslinking.

Since there was only 5% of the symmetrical trimer in the trimer mixture, only 5% of the 2.0 mls was effective as a crosslinker, or 0.00055 mole. The minute amount of the crosslinker and the high degree of crosslinking obtained, shows the superb effectiveness of the symmetrical trimer as a crosslinker.

EXAMPLE 4

This example demonstrates the use of tetracyclododecadiene as the crosslinker and is therefore, illustrative of the invention described herein.

The same procedure was used as in previous example using the following materials:
50 mls MTD
1.0 g Ethyl 774 hindered phenol antioxidant
0.05 g polydimethylsiloxane
0.2 ml neat tetracyclododecadiene (0.21 g or 0.001 moles)
2.4 mls propanol-1 soln (2.4 g or 1.2 m mole)
2.0 mls Et$_2$AlCl cocatalyst soln
2.0 mls molybdate catalyst soln The plaque was removed from the mold weighing 45.92 g, and it was rigid. The plaque was formed in 0.6 minutes after the mold was charged. There was evidence of lines or voids in the plaque. Monomer conversion was 95% and the swelling index of the plaque sample was an excellent 2.1.

EXAMPLE 5

This example also demonstrates the use of tetracyclododecadiene as a crosslinker, as does Example 4, above, however, amount of the crosslinker was one-half of that used in Example 4 and the cocatalyst used here was triethylaluminum with bis(tri-n-butyltin)oxide, whereas the cocatalyst in Example 4 was diethylaluminum chloride. This example is illustrative of the invention disclosed herein.

The same procedure was used here as in the preceding example using the following materials:
50 mls MTD
1.0 g Ethyl 774 hindered phenol antioxidant
0.05 g polydimethylsiloxane
0.1 ml neat tetracyclododecadiene
0.3 ml neat bis(tri-n-butyltin)oxide (0.35 g or 1.2 m mole Sn)
2.0 ml triethylaluminum cocatalyst 0.5M soln (2.0 g or 1 m mole Al)
4.0 ml molybdate catalyst soln The plaque was removed and weighted 45.81 g. It was rigid and was formed in 1.7 minutes after charging the mold. Monomer conversion was 90% and the swelling index for the plaque sample was an excellent 3.0.

EXAMPLE 5

Example 4 was repeated with one exception: whereas 0.2 ml of the tetracyclododecadiene crosslinker solution was used in Example 4, 2.0 ml of the same crosslinker solution was used herein.

Following the same procedure and using the same materials, a rigid plaque was obtained in 0.8 minutes with the following relevant data:
Monomer conversion—95%
swelling index—1.3

This example demonstrates that a higher degree of crosslinking can be achieved by using a higher level of crosslinker.

We claim:

1. Process for preparing a crosslinked polymer comprising the step of polymerizing a monomer charge comprising at least one cycloolefin monomer containing at least one norbornene group in the presence of a metathesis catalyst system and 0.0005 to 0.01 mole per mole of said monomer charge of a crosslinker selected from cycloolefin monomers containing two or more norbornene groups at least two of which are located at terminal or pendant positions of the molecule with at least one double bond in each of the norbornene groups, and mixtures of such crosslinkers; said crosslinked polymer has a swelling index of less than about 10 in toluene.

2. Process of claim 1 wherein said metathesis catalyst system includes a catalyst and a cocatalyst, said catalyst being selected from molybdenum compounds, tungsten compounds, and mixtures thereof, and said cocatalyst being selected from alkylaluminum compounds; wherein said cycloolefin monomer is selected from the following monomers, and mixtures thereof:

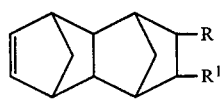 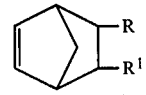

 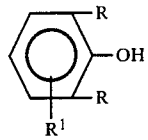

where R and R¹ are independently selected from hydrogen, alkyl, and aryl groups of 1 to 20 carbon atoms, and saturated and unsaturated cyclic groups containing 3 to 12 carbon atoms formed by R and R¹ and the two ring carbon atoms connected thereto; and wherein amount of said crosslinker is 0.005 to 0.5 mole of norbornadiene per mole of monomer charge or 0.0001 to 0.1 mole of other crosslinkers per mole of monomer charge.

3. Process of claim 2 wherein amount of said catalyst is 0.01 to 50 millimoles molybdenum or tungsten per mole of said cycloolefin monomer, the molar ratio of said cocatalyst as aluminum to said catalyst as molybdenum or tungsten is in the range of about 200:1 to 1:10; wherein R and R¹ groups of said cycloolefin monomer are independently selected from the hydrogen and alkyl groups of 1 to 2 carbon atoms; and wherein said catalyst is defined by the following formulas I and II:

$$[R_4N]_{(2y-6x)}M_xO_y \qquad (I)$$

$$[R_3^1NH]_{(2y-6x)}M_xO_y \qquad (II)$$

where each R and R¹ group is independently selected from hydrogen, alkyl, and alkylene groups each containing 1 to 20 carbon atoms, and cycloaliphatic groups each containing 5 to 16 carbon atoms, the sum of all carbon atoms represented by said R groups is 20 to 72 and the sum of all carbon atoms represented by said R¹ groups is 15 to 54; M is selected from molybdenum (VI) and tungsten (VI); and x and y represent the number of M and O atoms in the molecule.

4. Process of claim 3 wherein said crosslinker is selected from cycloolefin monomers having terminal or pendant norbornene groups with each terminal or pendant norbornene group having one double bond.

5. Process of claim 4 wherein said monomer charge also includes an additive selected from alkyltin oxides, alkylalkoxy tin, hindered phenols, and mixtures thereof; and wherein said cocatalyst is selected from trialkylaluminum compounds wherein each alkyl group is independently selected from alkyl groups containing 1 to 18 carbon atoms.

6. Process of claim 5 wherein said cocatalyst is selected from trialkylaluminum compounds where each alkyl group contains 2 to 4 carbon atoms; wherein said additive is selected from alkyltin oxides and alkylalkoxy tin compounds of the following formulas:

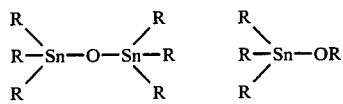

where each R can be same or different alkyl group of 1 to 18 carbon atoms; and wherein said hindered phenol is defined as follows:

where R groups are individually selected from alkyl groups containing 1 to 6 carbon atoms and substituted and unsubstituted alicyclic groups of 4 to 8 carbon atoms; and R¹, of which there is 1 to 3, is selected from hydrogen, alkyl groups of 1 to 12 carbon atoms, and substituted and unsubstituted alicyclic groups of 4 to 8 carbon atoms; amount of said alkyltin compounds is 0.5 to 2 moles of tin per 1 mole of aluminum in said cocatalyst and amount of said hindered phenol is 0.0001 to 0.05 as hydroxyl per mole of monomer charge.

7. Process of claim 6 wherein R and R¹ of said cycloolefin monomer are independently selected from hydrogen and alkyl groups of 1 to 2 carbon atoms; wherein the R groups of said alkyltin oxide are independently selected from alkyl groups containing 2 to 8 carbon atoms in each; and wherein the R groups of said hindered phenol are individually selected from tertiary alkyl groups of at least 4 carbon atoms each and there is one R¹ group at the 4-position selected from lower alkyl groups.

8. Process of claim 7 wherein said crosslinker is selected from tetracyclododecadiene, symmetrical dicyclopentadiene trimer, symmetrical reaction products of 2 moles of cyclopentadiene with a diene, and mixtures thereof.

9. Process of claim 4 comprising the steps of conveying said monomer charge into a mold maintained at an elevated temperature wherein polymerization takes place by ring opening of said cycloolefin monomer, and removing a rigid molded product from the mold in less than 10 minutes after conveying said monomer charge in to the mold; said monomer charge being in a fluid state at room temperature and comprising the cycloolefin monomer, the cocatalyst, the alkyltin oxide or the hindered phenol, and the crosslinker.

10. Process of claim 9 wherein said catalyst is tetrakistris(tridecyl)ammonium molybdate; said cocatalyst is selected from diethylaluminum chloride and triethylaluminum; said hindered phenol is selected from phenols wherein R at the 2-position is a tertiary alkyl group, wherein there are two R¹ groups with one being a tertiary alkyl group at the 6-position and the second being an alkyl group at the 4-position, each R¹ group containing 2 to 8 carbon atoms; said catalyst is used in amount of 1 to 10 millimoles thereof per mole of said cycloolefin monomer; said crosslinker is selected from tetracyclododecadiene, symmetrical dicyclopentadiene trimer, symmetrical reaction products of 2 moles of cyclopentadiene with a diene, and mixtures thereof; said cycloolefin monomer is selected from norbornene, methylnorbornene, tetracyclododecene, methyltetracyclododecene, dicyclopentadiene, tricyclopentadiene, hexacycloheptadecene, methylhexacycloheptedecene, and mixtures thereof; and said product has a swelling index of less than about 5 in toluene.

11. Process of claim 9 wherein said monomer charge contains up to about 20% by weight thereof of one or more other polymerizable comonomers in addition to said cycloolefin monomer, and wherein said product has a swelling index of less than about 5 in toluene.

12. Product comprising polymerization reaction product of a monomer charge containing at least one cycloolefin monomer containing at least one norbornene group prepared in the presence of a metathesis catalyst system and 0.0005 to 0.01 mole per mole of said monomer charge of a crosslinker selected from cycloolefin monomers containing two or more norbornene groups at least two of which are located at terminal or pendant positions of the molecule with at least one double bond in each of the norbornene groups, and mixtures of such crosslinkers; said crosslinked polymer has a swelling index of less than about 10 in toluene.

13. Product of claim 12 wherein said metathesis catalyst system includes a catalyst and a cocatalyst, said catalyst being selected from molybdenum compounds, tungsten compounds, and mixtures thereof, and said cocatalyst being selected from alkylaluminum compounds; wherein said cycloolefin monomer is selected from the following monomers, and mixtures thereof:

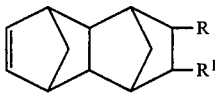 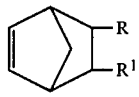

where R and $R^1$ are independently selected from hydrogen, alkyl, and aryl groups of 1 to 20 carbon atoms, and saturated and unsaturated cyclic groups containing 3 to 12 carbon atoms formed by R and $R^1$ and the two ring carbon atoms connected thereto.

14. Product of claim 13 wherein amount of said catalyst is 0.01 to 50 millimoles molybdenum or tungsten per mole of said cycloolefin monomer, the molar ratio of said cocatalyst as aluminum to said catalyst as molybdenum or tungsten is in the range of about 200:1 to 1:10; wherein R and $R^1$ groups of said cycloolefin monomer are independently selected from the hydrogen and alkyl groups of 1 to 2 carbon atoms; and wherein said catalyst is defined by the following formulas I and II:

$$[R_4N]_{(2y-6x)}M_xO_y \quad (I)$$

$$[R_3^1NH]_{(2y-6x)}M_xO_y \quad (II)$$

where each R and $R^1$ group is independently selected from hydrogen, alkyl, and alkylene groups each containing 1 to 20 carbon atoms, and cycloaliphatic groups each containing 5 to 16 carbon atoms, the sum of all carbon atoms represented by said R groups is 20 to 72 and the sum of all carbon atoms represented by said $R^1$ groups is 15 to 54; M is selected from molybdenum (VI) and tungsten (VI); and x and y represent the number of M and O atoms in the molecule.

15. Product of claim 4 wherein said monomer charge also includes a modifier compound selected from alkyltin oxides, hindered phenols, and mixtures thereof; and wherein said cocatalyst is selected from trialkylaluminum compounds wherein each alkyl group is independently selected from alkyl groups containing 1 to 18 carbon atoms.

16. Product of claim 15 wherein said cocatalyst is selected from trialkylaluminum compounds wherein each alkyl group contains 2 to 4 carbon atoms; wherein said modifier compound is selected from alkyl tin oxides and alkylalkoxy tin compounds of the following formulas:

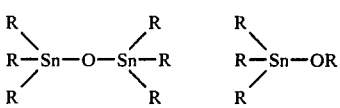

where each R can be same or different alkyl group of 1 to 18 carbon atoms; and wherein said hindered phenol is defined as follows:

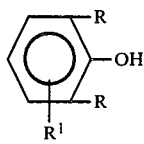

where R groups are individually selected from alkyl groups containing 1 to 6 carbon atoms and substituted and unsubstituted alicyclic groups of 4 to 8 carbon atoms; and $R^1$, of which there is 1 to 3, is selected from hydrogen, alkyl groups of 1 to 12 carbon atoms, and substituted and unsubstituted alicyclic groups of 4 to 8 carbon atoms; amount of said alkyltin oxide is 0.5 to 2 moles of tin per 1 mole of aluminum in said cocatalyst and amount of said hindered phenol is 0.0001 to 0.05 as hydroxyl per mole of monomer charge.

17. Product of claim 16 wherein R and $R^1$ of said cycloolefin monomer are independently selected from hydrogen and alkyl groups of 1 to 2 carbon atoms; wherein the R groups of said alkyltin compounds are independently selected from alkyl groups containing 2 to 8 carbon atoms in each; and wherein the R groups of said hindered phenol are individually selected from tertiary alkyl groups of at least 4 carbon atoms each and there is one $R^1$ group at the 4-position selected from lower alkyl groups.

18. Product of claim 17 wherein said crosslinker is selected from tetracyclododecadiene, symmetrical dicyclopentadiene trimer, reaction products of 2 moles of cyclopentadiene with a diene, and mixtures thereof.

* * * * *

UNITED STATES PATENT AND TRADEMARK OFFICE
CERTIFICATE OF CORRECTION

PATENT NO. : 4,701,510

DATED : October 20, 1987

INVENTOR(S) : Robert John Minchak and Parley Clive Lane, Jr.

It is certified that error appears in the above-identified patent and that said Letters Patent is hereby corrected as shown below:

| | |
|---|---|
| Col. 12, line 47, | replace "0.0005 to 0.01" with - 0.0001 to 0.1 -; |
| Col. 13, line 14, | replace "0.0001 to 0.1" with - 0.0005 to 0.01 -; |
| Col. 15, line 5, | replace "0.0005 to 0.01 with - 0.0001 to 0.1 -; |
| Col. 16, line 3, | replace "4" with - 14 -; |
| Col. 13, lines 12-15, | rewrite to read - carbon atoms connected thereto; and wherein amount of said crosslinker is 0.0005 to 0.01 per mole of monomer charge. -; |
| Col. 14, line 61, | replace "methylcycloheptedecene" with - methylcycloheptadecene -; |

Signed and Sealed this

Thirtieth Day of August, 1988

Attest:

DONALD J. QUIGG

Attesting Officer

Commissioner of Patents and Trademarks